United States Patent [19]

Scheps et al.

[11] Patent Number: 5,541,946
[45] Date of Patent: Jul. 30, 1996

[54] LASER WITH MULTIPLE GAIN ELEMENTS PUMPED BY A SINGLE EXCITATION SOURCE

[75] Inventors: Richard Scheps, Del Mar; Joseph F. Myers, Los Osos, both of Calif.

[73] Assignee: The United States of America as represented by the Secretary of the Navy, Washington, D.C.

[21] Appl. No.: 339,993

[22] Filed: Oct. 31, 1994

Related U.S. Application Data

[63] Continuation-in-part of Ser. No. 155,034, Nov. 19, 1993.
[51] Int. Cl.$^6$ ........................................... H01S 3/10
[52] U.S. Cl. ............................. 372/23; 372/100; 372/93; 372/22; 372/39
[58] Field of Search ................................. 372/92, 93, 94, 372/23, 19, 100, 69, 22, 70, 39, 108

[56] References Cited

U.S. PATENT DOCUMENTS

| | | | |
|---|---|---|---|
| 5,307,358 | 4/1994 | Scheps | 372/100 |
| 5,333,142 | 7/1994 | Scheps | 372/23 |
| 5,357,532 | 10/1994 | Aoshima et al. | 372/93 |

OTHER PUBLICATIONS

U.S. application Ser. No. 08/155,034, filed Nov. 19, 1993, Scheps et al.

*Primary Examiner*—Leon Scott, Jr.
*Attorney, Agent, or Firm*—Harvey Fendelman; Thomas Glenn Keough

[57] ABSTRACT

A laser produces laser emission at two or more wavelengths simultaneously. The laser includes at least two gain elements, and each gain element generates a different wavelength. A single optical pumping source is used for optically exciting all laser gain elements contained within the laser resonator cavity. A wavelength dispersing element such as a prism is disposed in the laser resonator cavity for dispersing the wavelengths operating simultaneously within the laser resonator cavity and to create separate regions for each laser gain element. Laser gain elements may be tunable laser gain elements or discretely emitting laser gain elements. Arbitrarily large wavelength separations between the wavelengths operating simultaneously may be achieved in this manner to produce stable cw or pulsed output, which may be Q-switched or line narrowed. Intracavity sum frequency generation can be produced efficiently by using a non-linear sum frequency generating crystal disposed at a laser resonator cavity waist. The multiple gain elements may be of different materials or the same material.

24 Claims, 3 Drawing Sheets

LASER WITH MULTIPLE GAIN ELEMENTS PUMPED BY A SINGLE EXCITATION SOURCE

STATEMENT OF GOVERNMENT INTEREST

The invention described herein may be manufactured and used by or for the Government of the United States of America for governmental purposes without the patent of any royalties thereon or therefor.

CROSS-REFERENCE TO RELATED APPLICATIONS

This is a continuation in part of U.S. patent application Ser. No. 08/155,034 filed Nov. 19, 1993 by Richard Scheps and Joseph F. Myers entitled "Laser With Multiple Gain Elements", and incorporates by reference herein all references thereof.

BACKGROUND OF THE INVENTION

The present invention relates to lasers and non-linear frequency conversion techniques, and particularly to a technique for simultaneously producing two or more wavelengths which are converted to a third wavelength using intracavity sum frequency generation.

Lasers are well-known devices that produce monochromatic optical radiation. Lasers contain an optical gain medium in a resonator. The laser resonator is composed of at least two reflective elements that provide optical feedback. These reflective elements define the laser resonator cavity, which is the volume contained along the reflective feedback path within the resonator.

Extremely narrow optical bandwidths can be obtained, and laser emission with a spectral purity approaching one part in $10^{14}$ has been demonstrated. However, the single emission wavelength, which for many applications is an important advantage of a laser, can also be a serious drawback. For example, numerous applications require specific, discrete wavelengths. In many instances there is no laser transmitter that operates at that specific wavelength, so that tunable lasers are highly suited to this type of application.

Tunable lasers can be either discretely tunable, by which is meant two or more specific wavelengths can be obtained from a given laser, or continuously tunable, by which is meant that over a certain band (or preselected range) of wavelengths any arbitrarily selected wavelength may be obtained. In addition, with continuously tunable lasers the emission bandwidth can be made extremely narrow to provide the possibility of obtaining truly monochromatic optical radiation from a given laser over a wide wavelength band.

Dye lasers are one example of a class of lasers that are continuously tunable. The range of tunability is typically less than 100 nm, and dye lasers are well-known to produce extremely narrow output bandwidths. Dye lasers operate in the wavelength range of approximately 400 nm to 750 nm. Dyes operating beyond 800 nm are usually unstable and are, in general, impractical. To cover the wide bandwidth range of 400 nm to 750 nm, typically five to six different dyes are needed.

While dye lasers and other continuously tunable lasers can be useful for applications requiring a discrete wavelength, other applications may simultaneously require more than one wavelength. Such applications include resonant two-photon spectroscopy, for example, or sum frequency generation (SFG). For SFG a non-linear optical crystal is utilized to produce an emission at a wavelength by summing the frequencies of radiation at two different wavelengths. If the two fundamental wavelengths are represented by $\lambda_1$ and $\lambda_2$, then the sum frequency wavelength, $\lambda_3$, is given by the expression:

$$\frac{1}{\lambda_1} + \frac{1}{\lambda_2} = \frac{1}{\lambda_3} . \quad (1)$$

From Equation 1 it can be seen that $\lambda_3$ is smaller than either $\lambda_1$ or $\lambda_2$. This technique is used commonly to obtain visible emission from infrared (IR) emitting lasers.

There are several types of lasers which have been demonstrated to simultaneously produce two wavelengths. Early demonstrations of multifrequency devices concentrated on pulsed dye lasers. See for example, H. S. Pilloff, "Simultaneous Two-wavelength Selection in the $N_2$ Laser Pumped Dye Laser," *Applied Physics Letters*, vol. 21, pp. 339–340, 1972; C. Wu and J. R. Lombardi, "Simultaneous Two-frequency Oscillation in a Dye Laser System," *Optical Communications*, vol 7, pp 233–236, 1973; and H. Lotem and R. T. Lynch, Jr., "Double Wavelength Laser," *Applied Physics Letters*, vol. 27, pp. 344–346, 1975.

The techniques used to demonstrate multifrequency dye lasers were generally oriented toward pulsed laser systems. These techniques typically use inefficient means to separate and tune the output wavelengths and are not suitable for continuous wave (cw) operation. More recently, a titanium-doped sapphire (Ti:sapphire) laser was demonstrated to operate cw multifrequency. This laser uses a tunable solid state laser gain element which operates over the wavelength range of about 680 nm to about 1.1 µ and is ideally suited for a number of applications that previously had used dye lasers. As mentioned above, some laser dyes that emit in the near-IR range of about 800 nm to 1 µ, tend to be unstable. The Ti:sapphire laser is a much more practical way of achieving cw tunable operation in this wavelength range. The Ti:sapphire gain element is a crystalline material that is typically shaped as a cylindrical laser rod with Brewster angle end faces.

The demonstration of a doubly resonant cw Ti:sapphire laser was recently reported in the literature. See for example, R. Scheps and J. F. Myers, "Doubly Resonant Ti:sapphire Laser," *IEEE Photonics Technology Letters*, vol 4, pp. 1–3, 1992. This same gain element, Ti:sapphire, had also previously been demonstrated to operate simultaneously at two wavelengths ("multifrequency") in a pulsed mode similar to the type of operation that had been previously obtained in dye lasers. See C. Kruglik, P. N. Nazarenko, N. V. Okldnikov, F. A. Skripko and A. A. Stavrov, "Autonomous Tunable Multifrequency Near-IR Laser," *Atmospheric Optics*, vol. 2, pp. 729–734, 1989; and S. G. Bartoshevich, I. V. Mikhnyuk, F. A. Skripko and I. G. Tarazevich, "Efficient Difference Frequency Oscillator Based on a Ti:sapphire Laser," *IEEE Journal of Quantum Electronics*, vol. 27, pp. 2234–2237, 1991.

Multifrequency operation of a tunable laser is desirable when there is independent wavelength and bandwidth control of each output wavelength. Such a device can be used more readily for numerous applications. U.S. Pat. No. 4,287,486 entitled "Laser Resonator Cavities with Wavelength Tuning Arrangements" by Ali Javan discusses various means of using tunable gain media to obtain multifrequency operation. All wavelengths in the Javan laser can emerge collinearly. Independent control of wavelength and spatial separation between wavelengths is provided. There are several apparent limitations in Javan's patent related to the wavelength tunability technique employed and to the spatial transverse mode control of the multifrequency laser output.

Regardless of the technique used to achieve simultaneous multifrequency operation in the pulsed or cw lasers, or discretely tunable or continuously tunable lasers discussed above, all techniques limit emission to a preselected range of wavelengths over which the gain material can produce optical gain. The gain of a given laser material at a specific wavelength is determined by the stimulated emission cross-section, σ. Numerous factors determine the spectral dependence of the stimulated emission cross-section. For a laser to operate at a given wavelength, the gain experienced at that wavelength must exceed the sum of all losses incurred. Losses are due to such factors as transmission through the resonator (output coupling), scattering and absorption.

The Ti:sapphire laser operating between 680 nm and 1.1 μhas one of the largest tuning ranges of any known laser material. Other gain materials such as $Cr^{3+}$-doped solid state materials and dye lasers have much narrower tuning ranges, typically on the order of 80 nm to 200 nm. If simultaneous dual wavelength operation is desired at two wavelengths for which no single gain material demonstrates gain, the techniques previously described and demonstrated cannot be used. A different type of laser is required.

Non-linear optical conversion is commonly used to produce visible radiation from solid state lasers operating in the near infrared. The most common non-linear optical conversion technique is a process called second harmonic generation, or doubling. In the doubling process the laser output is directed through a non-linear material, generally a crystal. The laser beam emerging from the non-linear crystal is at one-half the wavelength of the initial laser beam (i.e., the optical frequency is doubled). The initial laser wavelength is referred to as the "fundamental wavelength" and the shorter wavelength is called the "second harmonic".

An important parameter for efficient non-linear conversion is phase matching. Optimum conversion from the fundamental wavelength to the second harmonic wavelength will occur when the wave vector mismatch between the fundamental wave and the second harmonic wave is zero. This condition is termed "phase matching". Phase matching may be achieved in an anisotropic crystal by a suitable choice of the direction of propagation relative to the crystalline axes.

Two different types of second harmonic generation (SHG) can occur in non-linear crystals. The second harmonic process can be thought of as mixing two waves of identical wavelength to produce a third wave at one-half the wavelength. In this context, Type I SHG refers to the process where the two fundamental waves have the same polarization. Type II SHG occurs when the two fundamental waves have orthogonal polarization with respect to each other.

Phase matching is achieved as a result of the dispersion of the non-linear crystalline material. Dispersion refers to the dependence of the refractive index of a given material on wavelength. Phase matching is achieved in second harmonic generation when the refractive index at the fundamental wavelength is equal to the refractive index at the second harmonic wavelength. Because of dispersion, the refractive indices at the two wavelengths can be equal if the material is birefringent. That is, the crystal must have a different refractive index for the ordinary and extraordinary waves. In this case a propagation direction may be chosen with respect to the crystallographic axes where for a given fundamental wavelength the refractive indices for the second harmonic and the fundamental wavelengths are identical.

The conditions for phase matching depend specifically on the desired non-linear operation. For example, second harmonic generation of the Nd:YAG laser wavelength from 1.064 μ to 532 nm requires that the refractive index of the non-linear crystal at 1.064 μ and the refractive index at 532 nm be identical. In such a case, the phase relationship between the fundamental wavelength and the generated second harmonic wavelength remain unchanged as the two waves propagate along the length of the non-linear crystal.

When phase matched second harmonic generation is achieved by propagating the fundamental wavelength along a direction different from a principal axis of a birefringent crystal, it is termed "critical phase matching". When critically phase matched second harmonic generation is obtained with a focused beam, there is a phase mismatch of the wave vector for small deviations from the phase matched direction due to the finite divergence of the beam. However, since the efficiency of the non-linear conversion process is a function of the power density within the non-linear crystal, focusing is generally desirable to achieve high conversion efficiency.

When the phase matching angle is 90° for a particular non-linear process in a given material, it is termed "non-critical phase matching" (NCPM). In such a case, effects of beam divergence vanish. That is to say, a strongly focused beam in an NCPM crystal does not have the phase mismatch problems as is evident in critical phase matching. In addition, the walk-off angle, which is the angle of energy flow of the fundamental relative to the second harmonic beam, is zero. This allows the two beams (the fundamental and second harmonic) to propagate collinearly within the crystal.

NCPM is therefore a desirable and potentially highly efficient type of phase matching. One means by which NCPM can be obtained is by adjusting the temperature of the non-linear crystal to the point where the refractive index of the fundamental wavelength equals that of the second harmonic wavelength for a particular propagation direction with respect to the crystallographic axes. NCPM can also be achieved at room temperature for certain non-linear materials and fundamental wavelengths. Room temperature NCPM has the advantage of simplicity.

Second harmonic generation is a special case of a more general non-linear optical conversion process known as sum frequency generation. In second harmonic generation, two optical waves of the same wavelength are combined to produce a single wave of a wavelength one-half the original fundamental wavelength. In sum frequency generation, two fundamental waves of different wavelengths are combined to produce a third wavelength. The wavelength produced by sum frequency generation is determined by equation (1). Second harmonic generation is a degenerate case of sum frequency generation since for second harmonic generation $\lambda_1=\lambda_2$. The fundamental principles of non-linear optics summarized briefly above are well known and are discussed in detail in the literature. See for example, G. D. Boyd and D. A. Kleinman, *Journal of Applied Physics*, vol. 39, p. 3597, 1968.

In principle sum frequency generation (SFG) can be more efficient than second harmonic generation (SHG) under certain conditions. If a wavelength $\lambda_3$ is desired, it can be obtained by SFG using a particular $\lambda_1$ and $\lambda_2$ labeled $\lambda_{o1}$ and $\lambda_{o2}$. Obtaining $\lambda_3$ by SHG requires a fundamental wavelength $\lambda_1$ (equal to $\lambda_2$) equal to $2\lambda_3$. If the wavelength $2\lambda_3$ is not near the peak wavelength for a given laser, then the efficiency of producing $2\lambda_3$ may be low. It is often the case that $2\lambda_3$ is not near the peak emission wavelength or cannot be produced efficiently.

In addition, it is difficult to operate a laser at high power when it is tuned substantially off the peak output wavelength. If the fundamental wavelength $2\lambda_3$ is obtained from a laser for which the stimulated emission cross-section at $2\lambda_3$ is substantially lower than the peak stimulated emission cross-section, the wavelength corresponding to the peak stimulated emission cross-section may be emitted even though the laser is adjusted to operate at $2\lambda_3$.

On the other hand, using SFG it may be possible to identify two lasers such that $\lambda_{o1}$ and $\lambda_{o2}$ represent wavelengths for each laser which are at, or close to, the wavelengths for which the spectral dependence of the stimulated emission cross-section has a peak. Then the production of $\lambda_3$ by summing $\lambda_{o1}+\lambda_{o2}$ has significant advantages compared to the case where one must double the frequency at wavelength $2\lambda_3$, for which the stimulated emission cross-section might be substantially lower than that at the peak.

In general, sum frequency generation requires two lasers. This can introduce complexity in terms of alignment since beam spot sizes in the non-linear crystal must be quite small for efficient sum frequency generation.

An example of efficient sum frequency generation is given by the summation of the wavelengths 808 nm and 1.064 μ to produce 459 nm. The non-linear crystal $KTiOPO_4$ (KTP) is non-critically phase matched at room temperature for sum frequency generation at these two wavelengths. See K. Kato, *IEEE J. Quantum Electronics,* vol. QE-24, p. 3, 1988. Since 1,064 μ is the peak wavelength for Nd:YAG lasers and 808 nm is near the peak wavelength of several $Cr^{3+}$-doped solid state lasers as well as AlGaAs laser diodes and Ti:sapphire lasers, the sum frequency generation process can proceed quite efficiently using these two wavelengths to produce 459 nm.

On the other hand, achieving 459 nm through SHG requires that a laser be designed to produce 918 nm output. This wavelength is difficult to generate efficiently as only a few tunable lasers cover this wavelength range. In addition, 918 nm is not near the peak for the stimulated emission cross-section of any efficient, scalable laser. Furthermore, doubling 918 nm generally uses non-linear crystalline materials that are not as mature as KTP, such as $KNbO_3$, which is also less robust than KTP. Finally, it is difficult to obtain a high quality crystal which is non-critically phase matched at room temperature for second harmonic generation of 918 nm emission to produce output at 459 nm.

Typically, as mentioned above, SFG requires two different laser sources. Since the efficiency of the sum frequency generation process depends upon the power density (power per unit area) within the non-linear optical crystal, extremely small focused spot sizes within the non-linear sum frequency generating crystal are desirable. Using two different laser sources generally leads to problems involving the alignment of the beams to the high degree of accuracy required by these small spot sizes within the non-linear crystal. In addition, when using two separate laser sources, there are inefficiencies that result from spatial mismatching at the beam focus from the two lasers in terms of size, shape and intensity distribution.

It should be noted that for cw sum frequency generation the use of the non-linear SFG crystal within a resonator cavity ("intracavity") is desirable, since high power densities produce efficient SFG output. Therefore, the non-linear crystal used for cw SFG usually receives focused light within a laser resonator cavity to take advantage of the high circulating optical flux. The intracavity optical power is much higher than the power outside of the cavity. Note also that when a single laser resonator resonates both fundamental wavelengths $\lambda_1$ and $\lambda_2$ used for SFG, there should be no elements contained within the cavity that are strongly absorbing at either wavelength. Although good efficiency dictates the application of intracavity sum frequency generation to take advantage of the high circulating power at the fundamental wavelengths $\lambda_1$ and $\lambda_2$ for cw operation, for pulsed operation the non-linear optical crystal is placed external to the laser resonator cavity to obtain good sum frequency generation efficiency. However, in all cases small spot sizes within the laser crystal are desirable to enhance the conversion efficiency by increasing the power density. The maximum sustainable power density is determined by laser-induced optical damage to the nonlinear crystal or optical coatings on the crystal faces, as well as by thermal effects which created phase mismatch. Efficient SFG requires good alignment and good spatial mode matching between the beams representing the two fundamental wavelengths, $\lambda_1$ and $\lambda_2$.

Many of these requirements can be readily satisfied if both $\lambda_1$ and $\lambda_2$ are produced simultaneously by a single laser. In general, in order to achieve simultaneous operation at both wavelengths, the net round-trip gain at each wavelength must be comparable within the laser resonator cavity. However, the spectral dependence of the stimulated emission coefficient for a given laser material (which determines the intrinsic gain of the material) makes it unlikely that the net gain would be the same at both fundamental wavelengths for the SFG process, particularly if the two wavelengths are very different.

Thus, in accordance with this inventive concept a continuing need has been found in the state of the art for a laser for producing two wavelengths simultaneously to be used for sum frequency generation or other applications. Such a laser is useful where the separation between the two wavelengths is arbitrarily large, where it is desirable to scale the laser emission to higher output power, where efficient sum frequency generation insensitive to alignment is desired, and where the spatial modes at both wavelengths are approximately identical. In addition, such a laser can be pumped by a single pump source and can be used for intracavity sum frequency generation in a cw or pulsed mode, and contains no elements within the laser resonator cavity to reduce the intracavity power at either fundamental wavelength $\lambda_1$ or $\lambda_2$.

SUMMARY AND OBJECTS OF THE INVENTION

The present invention is directed to providing a laser which simultaneously operates at two or more wavelengths, with each wavelength emanating from a separate and distinct gain element contained within the laser resonator that is pumped by a single optical excitation source.

The laser resonator is composed of two plane highly reflective end elements, three concave fold elements and an output coupler reflective element, to form a reflective path and define a laser resonator cavity. Two or more laser gain elements are disposed in the laser resonator cavity and a single means for optically exciting the laser crystals is appropriately disposed to pump the laser gain elements to produce simultaneous laser emission at two or more wavelengths. A wavelength dispersion element such as a prism is disposed in the reflective path in the laser resonator cavity to provide a spatially separate path for each of the simultaneously emitted wavelengths and to determine the specific laser wavelengths that are produced simultaneously by the laser. The laser resonator cavity mode is collimated as it passes through the prism to optimize the wavelength dispersion performance of the prism.

Accordingly, an object of the invention is to provide a laser which simultaneously produces two or more wavelengths wherein each wavelength originates in a different gain element contained within the laser resonator cavity.

Another object of the invention is to provide a dual wavelength laser containing two gain elements pumped by a single excitation source.

Another object of the invention is to provide a dual wavelength laser in which the optical emission from one gain element can be used to optically pump another gain element.

Another object of the invention is to provide a dual wavelength laser that operates simultaneously at two wavelengths and converts the intracavity flux at the two fundamental wavelengths to a third wavelength by means of intracavity sum frequency generation.

Another object of the invention is to provide a dual wavelength laser containing two gain elements that can be pumped by a single laser diode or diode array.

Another object of the invention is to provide a tunable laser having the capability of operating simultaneously at two or more wavelengths that can be tuned independently of the other.

Another object of the invention is to produce efficient sum frequency generation in a dual wavelength laser by creating a waist or focus in the laser resonator cavity mode and by locating a non-linear sum-frequency generating crystal at the waist.

Another object of the invention is to provide a tunable laser which allows an arbitrarily large wavelength separation between the two wavelengths operating simultaneously.

Another object of the invention is to provide a Q-switched, multiple wavelength laser in which the pulse occurring at each wavelength occurs at the same time.

Another object of the invention is to provide a tunable laser that operates simultaneously at two or more wavelengths and lases in the lowest order spatial transverse mode (TEM$_{00}$) at both wavelengths.

Another object of the invention is to provide a tunable laser which operates simultaneously at two or more wavelengths and which contains a dispersive prism oriented for minimum deviation in a collimated region of the laser resonator cavity.

Another object of the invention is to provide a laser operating simultaneously at two or more wavelengths and containing separate and spatially distinct feedback paths for each wavelength in a region of the laser resonator cavity.

Another object of the invention is to provide a line narrowed tunable laser which produces a simultaneous output at two or more wavelengths with the bandwidth of each wavelength being substantially narrowed by the insertion of intracavity narrowing elements.

Another object of the invention is to provide a laser which contains two or more laser gain elements having a focus or waist created at one face of each laser gain element by an end pumping, optically exciting means to produce the lowest order TEM$_{00}$ laser mode.

Another object of the invention is to provide a laser operating simultaneously at two wavelengths that contains means for generating a tunable sum frequency generated output by adjusting the wavelength of one or both fundamental wavelengths.

Yet another object of the invention is to provide a laser which contains two gain elements composed of identical dopant and host materials that have an adjustable concentration of the dopant in each gain element to produce the best output efficiency at one of the two wavelengths.

These and other objects of the invention will become more readily apparent from the ensuing specification and drawings when taken in conjunction with the appended claims.

DETAILED DESCRIPTION OF THE PREFERRED EMBODIMENTS

This inventive concept involves the implementation of an optical laser resonator cavity that allows simultaneous laser oscillation at two or more laser wavelengths. Excitation can be provided by a single optical pump source.

The design features of this inventive concept, represented in several embodiments, provide efficient laser performance in several different modes of operation. Elements for line narrowed operation at one or more wavelengths, as well as shutters, apertures or the like to temporarily prevent operation at one or more wavelengths, may be inserted into the laser resonator cavity. Optically exciting each laser crystal in an end pumping mode creates a "gain aperture" in each laser crystal which allows the laser to operate only in the lowest order spatial transverse mode at the desired wavelength in the preselected range of wavelengths.

The design of the laser resonator cavity provides spatial separation of the various wavelengths and multiple gain elements operating simultaneously in one part of the laser resonator cavity. This design also provides collinear superposition of all of the laser wavelengths produced simultaneously in another part of the laser resonator cavity. Performance of the intracavity prism is enhanced if the prism is a Brewster angle dispersive prism placed in minimum deviation.

A non-linear sum frequency generating crystal can be placed within the laser resonator cavity in the region where the multiple simultaneously operating wavelengths are superimposed, allowing the sum frequency generated wavelength to be efficiently produced. In the case of SFG, two gain elements are the optimum number. Separate feedback paths are established for each wavelength which operates simultaneously The separate feedback paths are determined by the position and location of the intracavity Brewster angle prism and establish the location for each of the multiple gain elements. In one section of the laser resonator cavity spatially distinct, separate paths for the two or more wavelengths are established. In addition, the laser radiation may be linearly polarized and may contain a polarization rotating plate capable of rotating the polarization of one of more wavelengths operating simultaneously within the laser resonator cavity with respect to the others. This wave plate can be located in the laser resonator cavity when two fundamental wavelengths are operating simultaneously so that the polarization of the two fundamental wavelengths are oriented orthogonal to each other as they pass through the non-linear sum frequency generating crystal, but are parallel as they pass through other regions of the laser resonator cavity. The orthogonal orientation of the polarization of the two wavelengths in the non-linear crystal is required for a Type II SFG.

In the region where the two fundamental wavelengths are spatially overlapped a laser resonator cavity focus is established by suitable placement of reflective elements within the laser resonator cavity. At the location of this laser resonator cavity focus, a non-linear optical crystal is placed for the purpose of generating the sum frequency wavelength from two fundamental wavelengths oscillating within the laser resonator cavity.

The gain element may be end pumped or side pumped. For efficient end pumping a laser resonator cavity waist should be established at one face of each laser gain element. This face is coated to be highly reflective (HR) at the laser resonator wavelength and simultaneously, highly transmissive (HT) at the optical pump wavelength. In this manner, a gain aperture is established and $TEM_{00}$ operation, which is the lowest order spatial transverse mode, is insured.

Appropriate coatings are placed on all reflective and transmissive elements to reduce the loss at all laser wavelengths which are simultaneously resonated within the cavity. In addition, one or more reflective elements may be coated to partially transmit one or more of the fundamental wavelengths or, alternatively, to partially or completely transmit the sum frequency generated wavelength. The spatial intensity profile, or alternately, the transverse mode structure, of each of the fundamental wavelengths produced by each of the multiple gain elements contained within the laser cavity is almost identical. Therefore, a natural spatial mode matching is provided which further enhances the sum frequency generation efficiency.

The design of the optical laser resonator cavity disclosed herein is generic and could be used in laser systems having a gain element with several fixed wavelength transitions such as Nd:YAG where the 1.06 µ transition operates simultaneously with laser lines at 1.32 µ, 1.34 µ, 1.36 µ, 1.42 µ, 1.44 µ and 0.942 µ or in other continuously tunable laser systems such as Cr,Tm:YAG which tunes between about 1.9 µ and about 2.1 µ or an alexandrite laser which tunes between approximately 720 and 840 nm. Other exemplary laser systems are:

Cr:LiCAF which can be tuned between approximately 720 nm and 850 nm; Cr:LiSAF which can be tuned between approximately 760 nm and 1 µ;

Cr:LiSGAF which can be tuned between approximately 800 nm and 900 nm;

Tm:YAG which can be tuned between about 1.87 µ and about 2.16 µ;

Ho:YAG which can be tuned between approximately 2.05 µ and 2.15 µ, and between approximately 2.84 µ and 2.92 µ; and Er:YAG which can be tuned between approximately 2.7 µ and 2.96 µ.

Alexandrite has the chemical formula $BeAl_2O_4$. LiCAF has the chemical formula $LiCaAlF_6$. LiSAF has the chemical formula $LiSrAlF_6$. LiSGAF has the chemical formula $LiSrGaF_6$.

It is clear in the case of either discretely tunable laser gain elements, such as Nd:YAG, or continuously tunable gain media, such as Cr:LiSGAF, that gain elements of essentially the same gain material may be used in the laser resonator. For example, with Nd:YAG a laser can be designed which operates simultaneously at 1.06 µ and 1.32 µ by using two Nd:YAG gain elements in separate arms of the laser resonator cavity. Alternatively, if simultaneous operation at 820 nm and 840 nm is desired, two Cr:LiSGAF gain elements could be used in spatially separate parts of the cavity, one producing one of the two desired wavelengths, while the second Cr:LiSGAF crystal produces the other wavelength.

An additional parameter that can be varied is the dopant density. That is, the two gain elements may consist of identical host materials, but the concentration of activator ions in a solid state gain element, or the dye concentration in a given solvent, for example, can be adjusted to obtain the optimum emission performance at any specified wavelength. Therefore, if a specific active species concentration is ideal for one wavelength while a different concentration is ideal for another, then each gain element can be tailored by adjusting the concentration to produce to optimum emission at each desired wavelength. In addition, the host can be changed to optimize the emission of a given dopant or active specie at a given wavelength.

Using this inventive concept the problems associated with gain competition, by which two wavelengths compete for the population inversion (or gain) in a single gain element, can be mitigated. Gain competition has been found to impose a limitation on simultaneous, multiple wavelength operation of a laser which uses a single gain element, see for example R. Scheps and J F. Myers "Doubly Resonant Ti:sapphire Laser," *IEEE Photonics Technology Letters*, vol. 4, pp. 1–3, 1992. Therefore, simultaneous, stable cw or pulsed laser operation at two wavelengths can be obtained by using two gain elements of similar materials in the laser cavity. The gain elements are located in separate regions of the laser resonator, and the laser is designed so that the feedback path for each wavelength is spatially separate.

The optical laser resonator cavity can be resonantly pumped or flash pumped. The wavelength range over which the laser system operates in the case of a solid state laser is determined by the dopant or dopants used in the laser gain element host (crystalline or glass) as well as by the reflective coatings and the transmission of the optical elements contained within the laser resonator cavity. As discussed above, some of the exemplary dopants ("activator ions") that can be used in solid state laser hosts are $Er^{3+}$, $Ho^{3+}$, $Nd^{3+}$, $Cr^{3+}$, $Ti^{3+}$ and $Tm^{3+}$. In addition, other activator ions which can be used are various ones of divalent $Mn^{2+}$, $Co^{2+}$ and $Ni^{2+}$, and quadrivalent $Cr^{4+}$ and $V^{4+}$ metal ions; trivalent actinides ($U^{3+}$); and divalent rare earth ions ($Sm^{2+}$, $Tm^{2+}$ and $Eu^{2+}$).

The design of the optical laser resonator cavity disclosed herein is generic and can be used either in laser systems with discretely tunable or continuously tunable gain media. In addition, the design of the optical laser resonator cavity disclosed herein could be used with crystalline or noncrystalline amorphous or glass-like gain media as well as liquid gain media such as dye lasers or chelate lasers, or gaseous gain media. The sum frequency generating process disclosed herein can be either Type I or Type II and can produce sum frequency wavelengths from the ultraviolet to the infrared. Furthermore, the sum frequency generating crystal can be critically phase matched or non-critically phase matched. The fundamental wavelengths can be line narrowed to produce line narrowed sum frequency generated output, or may be broadband, in which case a broadband sum frequency generated output is produced. The technique described herein is appropriate for both cw and pulsed laser operation.

Figure 1:
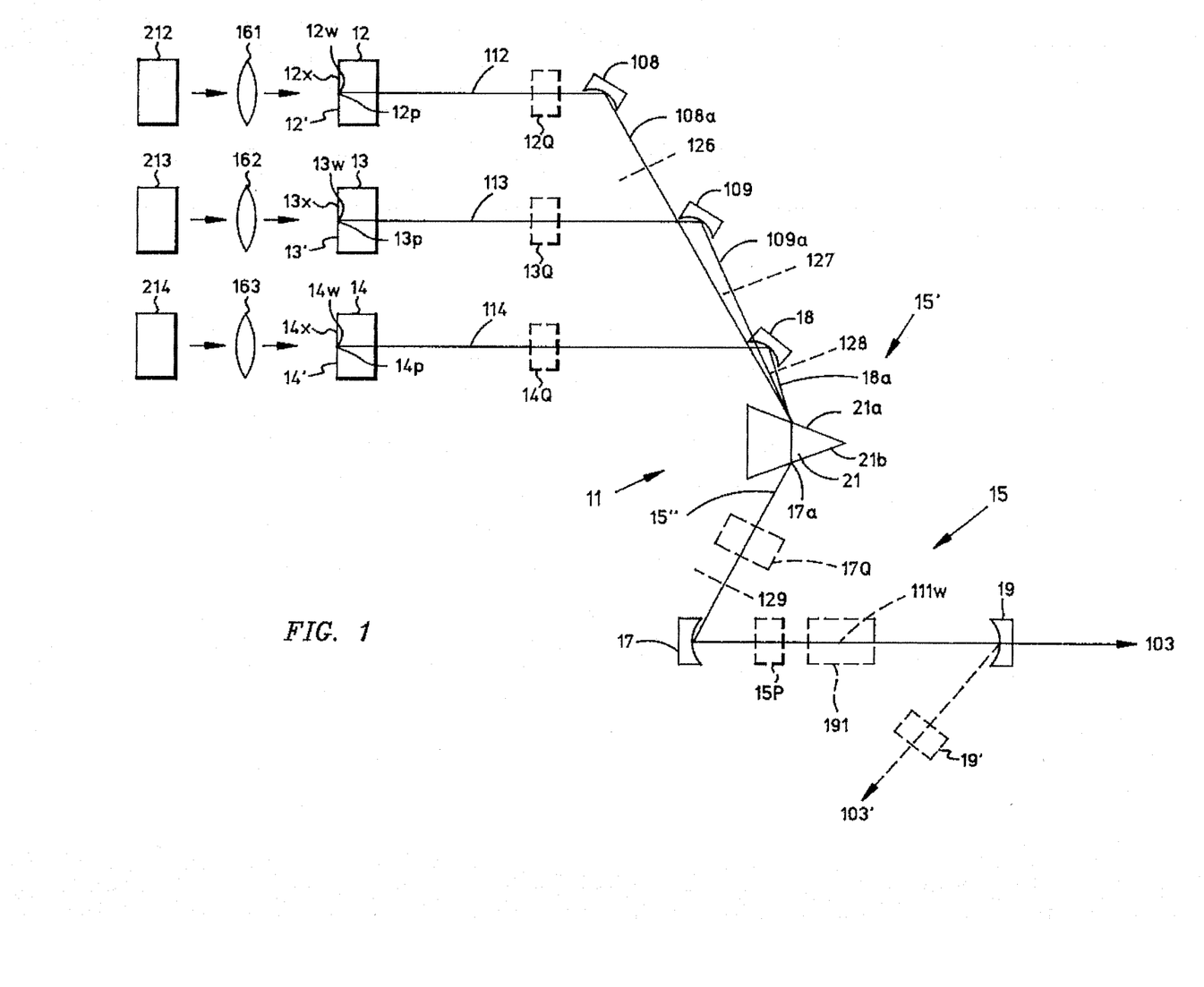
FIG. 1 shows a first laser configuration.

Referring now to the drawings wherein like reference numerals designate identical or corresponding parts throughout the several views, FIG. 1 illustrates the a first laser configuration. This laser configuration may be modified by this inventive concept. Tunable laser 11 contains three laser gain elements 12, 13 and 14. Laser resonator 15' is defined by optically aligned output mirror 19, fold mirrors 17, 18, 108 and 109, and end reflective coatings 12', 13' and 14' placed on exterior faces 12x of laser gain element 12, 13x of laser gain element 13, and 14x of laser gain element 14, respectively.

The interior region of laser resonator 15' is referred to as the "laser resonator cavity" and labelled 15 in FIG. 1. Fold mirrors 108, 109 and 18 produce laser resonator cavity foci or waists 12w, 13w and 14w, respectively, at the exterior faces 12x, 13x and 14x of laser gain elements 12, 13 and 14, respectively. Concave fold mirrors 108, 109 and 18 collimate the laser resonator radiation emerging from laser gain elements 12, 13 and 14, respectively, and reflect the collimated radiation along paths 108a, 109a and 18a, respectively, to laser prism 21.

Radiation emerging from laser prism 21 towards fold mirror 17 remains collimated and the resonator mode for each simultaneously produced wavelength emerging from the respective gain element is spatially superimposed in the region of the laser resonator cavity between laser prism 21 and output mirror 19. Concave fold mirror 17 is spaced with respect to concave partially reflective output mirror 19 to produce an additional resonator cavity waist 111w in a non-linear crystal 191 located between mirrors 17 and 19. The exact location of the waist depends on the radii of curvature of mirrors 17 and 19 as well as on the separation between them. For identical radii of curvature and a separation equal to approximately twice the radius of curvature, the waist occurs at one-half the separation between mirrors 17 and 19.

By inserting a high dispersion laser prism 21 in laser resonator cavity 15, separate feedback paths are established for each wavelength produced by individual gain elements 12, 13 and 14, respectively. The use of a Brewster angle prism in minimum deviation provides low insertion loss while minimizing the amount of astigmatism introduced to the laser mode. The resonator mode is collimated as it passes through prism 21, and tuning may be achieved either by rotating prism 21 about the axis normal to the plane of FIG. 1 ("vertical axis"), or rotating either fold mirror 108, 109 or 18 about its corresponding vertical axis. In the case where Brewster angle laser prism 21 is rotated, all wavelengths change simultaneously while the wavelength separation between each wavelength emanating from each of feedback paths 112, 113 and 114 are held constant. By rotating either fold mirror 108, 109 or 18, only the wavelength along feedback path 112, 113 or 114, respectively, is changed while the other two wavelengths remain constant. A similar, but less convenient approach to changing wavelengths along only one of the feedback paths can be accomplished by rotating laser gain element 12, 13 or 14 in conjunction with a rotation of the corresponding fold mirror. The inconvenience in this instance arises from the subsequent realignment that is required along the feedback path for which the wavelength was adjusted.

An important feature of laser resonator 15' is that all wavelengths emerge simultaneously from output mirror 19 and are spatially overlapped. In addition, the spatial mode, shape and size for each wavelength are similar to those for the other wavelengths.

Optical source 212 is used in conjunction with lens 161 to end pump laser gain element 12, optical source 213 is used in conjunction with lens 162 to end pump laser gain element 13 and optical source 214 used in conjunction with lens 163 is used to end pump laser gain element 14. The pump flux from optical source 212, 213 or 214 is shaped by lens 161, 162 and 163, respectively, to match or overlap the laser resonator mode in laser gain element 12, 13 or 14, respectively, as well as match, or coincide with, the mode waist 12w, 13w and 14w, respectively. In this manner, a gain aperture is established in each gain element ensuring high efficiency $TEM_{00}$ operation.

Optical pump source 212, 213 or 214 may be any suitable optical source, including a cw laser, a pulsed laser, a laser diode or an incoherent source such as a flash lamp or incandescent lamp. For ease of understanding this laser configuration, optical sources 212, 213 and 214 will be described in terms of laser diodes, and lenses 161, 162 and 163 may be a single lens or lens combinations such as combinations of spherical and/or cylindrical lenses, as well as reflecting mirrors. Lenses 161, 162 and 163 are selected to transfer the maximum power and efficiency from optical sources 212, 213 and 214, respectively, to laser gain elements 12, 13 and 14, respectively, while matching both the laser resonator cavity mode waists 12w, 13w and 14w, respectively, and the divergence of the laser resonator cavity mode within laser gain elements 12, 13 and 14, respectively. This mode overlap provides the optimum pump efficiency for end pumping.

Optical excitation of laser gain elements 12, 13 and 14 is achieved using end pumping to improve the pump efficiency, particularly when the pumping mode is oriented and focused for mode overlap, as disclosed herein. Exterior faces 12x, 13x and 14x of laser gain elements 12, 13 and 14, respectively, are coated to be simultaneously HR at the wavelengths along feedback paths 112, 113 and 114, respectively, and highly transmissive to the pump wavelength radiation emanating from optical sources 212, 213 and 214, respectively. These highly reflective coatings on the exterior faces of laser gain elements 12, 13 and 14 in this exemplary case are termed "highly reflective end elements".

The diameter of laser resonator cavity waists 12w, 13w and 14w and pump waists 12p, 13p and 14p can be adjusted so that each pump waist matches or coincides with the respective cavity waist. This is accomplished by proper selection of the focal length of lenses 161, 162 and 163. Matching the waists 12w and 12p, 13w and 13p and 14w and 14p, in both size and position leads to the best pump and output efficiency for tunable laser 11 as well as establishing a gain aperture to select the lowest order ($TEM_{00}$) spatial mode.

Dispersive Brewster angle laser prism 21 is oriented for minimum deviation to provide the least amount of astigmatism within the laser resonator cavity. The prism faces are uncoated and oriented at Brewster's angle with respect to the laser resonator cavity mode 15" at position 17a. The prism material should be a highly dispersive glass, such as the type of glass that is used for Faraday rotators. The glass selected should have minimum absorption over the range of wavelengths along feedback paths 112, 113 and 114. Suitable materials for the prism are commercially available and may include such glasses as Kigre M-16 glass and Schott glass SF55.

Concave fold mirrors 108, 109, 18 and 17 are disposed offaxis. This will introduce astigmatism within the laser resonator cavity mode. The astigmatism can be minimized by minimizing the angles between the incident and reflected rays at each mirror. While the illustration in FIG. 1 indicates relatively large angles at the fold mirrors, these angles are exaggerated in the figure for clarity and for ease in distinguishing the various components of the laser configuration illustrated in FIG. 1. In practice, the angles of incidence and reflection at fold mirrors 108, 109, 18 and 17 can be made extremely small, thereby reducing the astigmatism.

The laser resonator cavity mode is collimated along each feedback path in the region between fold mirrors 108, 109 and 18, respectively, and concave fold mirror 17. Collimation is effected by proper selection of the radii of curvature of fold mirrors 17, 18, 108 and 109, and proper spacing between fold mirror 108 and exterior face 12x of laser gain element 12, fold mirror 109 and exterior face 13x of laser gain element 13, and fold mirror 18 and exterior face 14x of laser gain element 14. Brewster angle laser prism 21 is placed in the collimated region of the laser resonator cavity to improve the wavelength resolution, and to increase dispersion along feedback paths 112, 113 and 114.

Independent tuning of each output wavelength along feedback paths 112, 113 and 114 is obtained by angular adjustment of fold mirror 108, 109, or 18, respectively. The resulting tuning occurs only at the wavelength which is being fed back through prism 21 by the fold mirror that is being rotated. For example, rotating mirror 108 about the axis that vertically extends upward from the plane of FIG. 1 will change the wavelength of feedback along feedback path 112 but will not affect the wavelength along feedback paths 113 or 114. Alternatively, prism 21 can be rotated to simultaneously tune the wavelengths along feedback paths 112, 113 and 114.

Typically, the shortest feedback wavelength, as illustrated in FIG. 1, is along path 114. The next longer wavelength is along feedback path 113 and the longest wavelength is along feedback path 112. The ordering of wavelengths along the various feedback paths is determined by the dispersion of the material used for laser prism 21. Dispersion refers to the change of the refractive index with wavelength. Typically, the refractive index decreases as the wavelength increases. By Snell's law, then, the angle of refraction at the interface between prism face 21a and the feedback path 112, 113 or 114 decreases as the refractive index of prism material 21 decreases. Clearly, if the refractive index of prism 21 were 1.0, the angle of refraction would be zero.

Laser prism 21 may be one or more prisms used to provide the appropriate dispersion within laser resonator cavity 15. Laser output 103 emitted by tunable laser 11 contains three exemplary wavelengths that are spatially overlapped and collinear. The output wavelengths determine the composition of laser gain elements 12, 13 and 14. The most efficient operation will occur when the wavelength desired along feedback path 112, for example, is near the peak wavelength for emission by laser gain element 12. If laser gain element 12 can produce a tunable laser emission, then the laser wavelength along feedback path 112 should correspond to a wavelength near the peak emission for laser gain material 12. If laser gain material 12 emits discrete laser wavelengths, then the wavelength along path 112 must correspond to one of the discrete emission lines.

With appropriate modifications, the design illustrated in FIG. 1 can be operated simultaneously at more than three wavelengths. These modifications are straightforward and require one additional gain element and one appropriately disposed concave fold mirror for each additional wavelength. The laser resonator modes representing additional wavelengths can be spatially matched to all other wavelengths operating simultaneously, and can be made collinear in the region between laser prism 21 and output mirror 19.

Line narrowing elements 126, 127 or 128 may be placed in feedback paths 112, 113 or 114, respectively, to narrow the linewidth of the emission at wavelengths corresponding to feedback paths 112, 113 or 114, respectively. Alternatively, line narrowing element 129 can be placed in the path where all wavelengths are collinear, as shown in FIG. 1, to produce simultaneous narrowing at all three wavelengths. In addition, means 12Q can be inserted in feedback path 112 to interrupt radiation along feedback path 112, means 13Q can be inserted in feedback path 113 to interrupt radiation along feedback path 113, and means 14Q can be inserted along feedback path 114 to interrupt radiation along feedback path 114. Means 12Q, 13Q and 14Q can be optical shutters, for example, or electrooptic or acoustooptic Q-switches. Insertion of interrupting means 12Q, 13Q or 14Q will lead to pulsed operation along feedback paths 112, 113 or 114, respectively. In this manner optical output at one or more wavelengths can be Q-switched. Alternatively, a single means for interrupting the feedback along all three paths simultaneously, 17Q, can be placed in the location where all three wavelengths are spatially collinear to simultaneously Q-switch the output from all three gain elements.

It is important to note that the Q-switch build-up time, which is the delay between the time the means for interrupting radiation first opens and the time that a laser pulse is emitted, depends to a great extent on the optical gain within the laser gain element. Therefore, locating a single Q-switch 17Q, as shown in FIG. 1, will only be effective in producing simultaneous Q-switched outputs at all three wavelengths exemplary if the optical gain in each of elements 12, 13 and 14 is approximately equal. The gain in each laser gain element is a function of the pump intensity from optical source 212, 213 or 214 incident on laser gain elements 12, 13 and 14, respectively, and the stimulated emission cross-section at the emission wavelength for each laser gain element. A matching of the gain achieves simultaneous emission of the Q-switched pulses from the three exemplary gain elements and can be obtained by appropriate adjustment of the pump intensity from optical sources 212, 213 and 214. In addition, the net gain for each gain element depends on the specific feedback wavelength. In the absence of comparable gain in all three gain elements, Q-switching by means 17Q, for example, will still be effective but the pulses will emerge at different times.

Appropriate optical coatings on all reflective and transmissive elements contained within laser resonator cavity 15 are important for determining the wavelength range over which tunable laser 11 can operate. For optics contained in that part of the resonator where the wavelengths operating simultaneously are spatially separate, that is, the region between prism face 21a and exterior faces 12x, 13x, and 14x of gain elements 12, 13 and 14, respectively, the optical coatings on elements contained within each spatially separate path should have appropriate reflective or transmissive properties for the specific wavelength or wavelengths fed back along each respective feedback path. However, optical elements between prism 21 and output mirror 19 must be coated for all wavelengths operating simultaneously.

The laser resonator cavity can be divided into two regions: one region where the simultaneously operating wavelengths are spatially separated and another region where the simultaneously operating wavelengths are spatially superimposed and collinear. The region where the wavelengths are spatially separated extends from gain elements 12, 13 and 14 in the exemplary case shown and illustrated in FIG. 1 through fold mirrors 108, 109 and 18, respectively, and to laser prism 21. The region where the simultaneously operating wavelengths are spatially superimposed and collinear extends from laser prism 21 through fold mirror 17 and to output coupler mirror 19.

Having these two distinct regions in the laser resonator cavity, provides important benefits. In the region where the wavelengths are spatially separated one wavelength can be modulated without affecting the other. This can be done, for example, by insertion of a shutter or an electrooptic or an acoustooptic Q-switch such as means 12Q, 13Q or 14Q, illustrated in FIG. 1. In addition, operation at one wavelength can be enhanced by insertion of an optical amplifier in feedback path 112, 113 or 114. Furthermore, the insertion of a line narrowing element such as 126, 127 or 128 in one wavelength path will narrow that wavelength without affecting the bandwidth of the other.

The importance of having a region where all wavelengths are spatially collinear and superimposed is that for operations such as intracavity sum frequency generation, where two wavelengths are summed in a non-linear crystal to produce a third, shorter wavelength, it is required that the feedback path for these wavelengths be spatially collinear throughout the non-linear crystal.

Another feature of laser resonator cavity 15 illustrated in FIG. 1 is that laser resonator cavity mode 15" is collimated in one region of laser resonator cavity 15 and focused in another region of laser resonator cavity 15. Referring to the exemplary case illustrated in FIG. 1, laser resonator cavity mode 15" is collimated between fold mirror 17 and fold mirrors 108, 109 or 118, respectively. It is to be noted that in essence there are three separate laser resonator cavity modes illustrated in FIG. 1 corresponding to the three feedback paths 112, 113 and 114, respectively, in this exemplary case. The laser resonator mode is focused between fold mirror 17 and output mirror 19, as well as between laser gain element 12 and fold mirror 108, laser gain element 13 and fold mirror 109, and laser gain element 14 and fold mirror 18.

The importance of having a collimated region in laser resonator cavity 15 is that intracavity elements such as prism 21, etalons 126, 127, 128 or 129, or a birefringent tuner, for example, can be efficiently utilized. On the other hand, there are several reasons why it is important to provide focused regions in the laser resonator cavity. For end pumping, which is the technique by which laser gain elements 12, 13 and 14 are optically excited in this exemplary case, the highest efficiency and lowest threshold operation occurs when the laser resonator cavity waist within the gain element is small and matches the pump waist. A second advantage of having a focused region is that when intracavity elements are inserted, for example those that produce non-linear operations such as sum frequency generation, it is important to have a small laser resonator cavity waist near the location where the non-linear crystal is inserted. This is because the efficiency of sum frequency generation, which is an example of a non-linear operation, depends on the power density in the non-linear crystal.

In the laser configuration illustrated in FIG. 1 there are three laser resonator cavity modes operating simultaneously, one for each wavelength. Each of these modes has two waists, one at the exterior face of laser gain element 12, 13 or 14, labelled 12w, 13w and 14w, respectively, and one between fold mirror 17 and output mirror 19 labelled 111w and illustrated in FIG. 1. The importance of laser resonator cavity waist 111w is that at this location the three exemplary wavelengths come to a focus simultaneously, thereby enhancing the power density and the efficiency of non-linear operations when non-linear crystal 191 is positioned as illustrated in FIG. 1.

Establishing a waist at exit faces 12x, 13x and 14x of gain elements 12, 13 and 14, respectively, establishes gain apertures in each gain element as discussed above, thereby promoting laser operation in the lowest order spatial mode of the laser resonator cavity and obviating the need for the insertion of a lossy, hard aperture for achieving low order spatial mode operation. A hard aperture was required to obtain the lowest order spatial mode in the Javan patent cited above.

Optionally, optical source 212, 213 or 214 can be a laser diode, aluminum gallium arsenide or indium gallium arsenide or aluminum gallium indium phosphide, or can be another cw laser source such as a doubled Nd:YAG laser or a dye laser, or any other laser source the output of which is absorbed by laser gain element 12, 13 or 14. Alternately, optical source 212, 213 or 214 can be an incoherent source or can be a pulsed source. In addition, laser gain elements 12, 13 or 14 can be any length. In general, the length of the laser gain element is selected to provide adequate gain at the desired operating wavelength and adequate absorption of the pump optical power. In addition to adjusting the length of the gain element the concentration of the dopant material is adjustable.

For pulsed excitation the output of the laser will be pulsed. For cw excitation, the operation will be either cw or pulsed, depending on whether elements for interrupting cw operation are inserted into the laser resonator cavity. Multifrequency operation in the pulsed mode can occur either with simultaneous pulses or sequential pulses at each wavelength.

Laser gain elements 12, 13 and 14 can be the same material or different materials. Furthermore, these gain elements can be solid state gain elements, semiconductor gain elements, gaseous or liquid gain elements or any combination thereof. The concentrations of the active specie in laser gain elements 12, 13 or 14 can be similar or different depending on the desired mode of operation and the specific wavelengths desired in laser output 103.

For intracavity sum frequency generation only two fundamental wavelengths operating simultaneously are required. Therefore, one feedback path, for example 114, can be eliminated along with fold mirror 18, laser gain element 14, optical source 214 and lens 163. In this case, wavelengths along feedback paths 112 and 113 represent the two fundamental wavelengths. Non-linear crystal 191 is designed for sum frequency generation (SFG) of the wavelengths along paths 112 and 113.

Both fundamental wavelengths have nearly identical spatial modes and are superimposed and collinear within non-linear crystal 191. In addition, the power density at both fundamental wavelengths is extremely high, leading to efficient intracavity sum frequency generation. Output mirror 19 in this exemplary case can be coated to be highly reflective for both fundamental wavelengths while simultaneously being highly transmissive for the sum frequency generated wavelength. Therefore, laser output 103 will contain only the sum frequency generated wavelength while the intracavity flux at the fundamental wavelengths will be significantly enhanced.

For Type II intracavity SFG the polarization of the two fundamental wavelengths must be orthogonal to one another. It is relatively straightforward in some cases to design laser gain elements 12 and 13 to produce orthogonal polarization with respect to one another along feedback paths 112 and 113, respectively. This can be accomplished by the use of polarizing Brewster elements, or by the appropriate orientation of the crystalline axes of anisotropic solid state laser gain elements, for example. However, the reflection of one of the polarizations by Brewster faces 21a and 21b of Brewster angle laser prism 21 will reduce the efficiency of operation at the wavelengths for which the polarization is oriented perpendicular to the plane of incidence.

A more efficient manner of obtaining the desired orthogonal polarization orientation in non-linear crystal 191 is by the insertion of polarization rotation means 15P, as illustrated in FIG. 1. Polarization rotation means 15P can be a multiple order waveplate, for example, which rotates the polarization of the wavelength along feedback path 112 by an integral number of full waves while rotating the polarization of the wavelength along feedback path 113 by an integral number of half-waves. Resonator radiation reflected by fold mirror 17 towards polarization means 15P will consist of a parallel orientation of the polarization of both wavelengths. This radiation emerges from polarization rotation means 15P with the polarization orientation of the two wavelengths perpendicular to each other. This orientation is maintained as the radiation enters non-linear crystal 191.

The orthogonal orientation of the two polarizations is not changed by non-linear crystal 191 and continues to be maintained after reflection by output mirror 19. As the fundamental radiation reflected from output mirror 19 back towards fold mirror 17 passes again through non-linear crystal 191, the orthogonal orientation of the two polarizations is maintained. Therefore, in both passes through non-linear crystal 191 the fundamental wavelengths are orthogonally polarized. Upon entering waveplate 15P in the direction towards fold mirror 17, however, the orthogonal polarization is once again realigned for parallel orientation.

An example of intracavity sum frequency generation using the laser illustrated in FIG. 1 can be given for the case of sum frequency generation at *808* nm and 1.06 µ to generate 459 nm (blue) radiation. As discussed above only two gain elements are required and laser gain element 14, fold mirror 18, optical source 214 and lens 163 can be eliminated. For this example cw intracavity sum frequency generation will be discussed; however, it is to be understood that pulsed, cw or repetitively Q-switched sum frequency generation can easily can be accommodated by this laser configuration and discussed above.

Laser gain element 12 represents the shorter wavelength, 808 nm. Laser gain element 12 can be the solid state laser gain material Cr:LiSGAF, for example. Laser gain element 13 must operate at 1.06 µ and can be, for example, Nd:YAG. Optical source 212 can be, for example, one or more laser diodes emitting in the wavelength range of 620 to 680 nm, such as AlGaInP laser diodes. Pump source 213 can be, for example, one or more laser diodes emitting at 808.5 nm such as AlGaAs laser diodes. In this exemplary case, non-linear crystal 191 is a Type II KTiOPO$_4$ (KTP) laser crystal cut along the crystallographic XYZ axes for non-critically phase matched sum frequency generation at room temperature. Polarization rotation means 15P can be a multiple order waveplate which rotates the polarization of the 808 nm mode by an integral number of full wave rotations and the polarization of the 1.06 µ mode by an integral number of half-wave rotations. Laser output 103 will be at 459 nm. Output mirror 19 is coated HR at both 808 nm and 1.06 µ, and highly transmissive (HT) at 459 nm, while fold mirror 17 is coated HR at 808 nm and 1.06 µ.

Laser prism 21 in this exemplary case may be made of Schott glass SF55. The important criteria for the prism material in this exemplary case is that it should have high dispersion and extremely low absorption at both 808 nm and 1.06 µ. Many glasses which satisfy the condition of high dispersion also have high absorption losses, particularly at 1.06 µ. While numerous glasses may be satisfactory for this application, Schott SF55 glass is used in this exemplary case because it is readily available in the high optical quality required for intracavity laser operation. This glass has an Abbe value of 26.95 and an absorption of less than 0.1% per centimeter at both 808 nm and 1.06 µ. Laser prism 21 has Brewster cut optical faces and is oriented for minimum deviation.

For efficient intracavity sum frequency generation the optical power along feedback paths 112 and 113 should be approximately equal. This can be obtained by taking into account the stimulated emission cross-sections for laser gain elements 12 and 13 at the desired output wavelengths and adjusting the dopant densities, the length of the gain elements and the optical pump power from pump sources 212 and 213, respectively. The dependence of the power at the sum frequency generated wavelength, $P_3$, depends on the product $P_1 \times P_2$, where $P_1$ and $P_2$ are the powers at the two fundamental wavelengths. From simple calculus it can be shown that when $P_1+P_2$ is constant, the product $P_1 \times P_2$ is maximized when $P_1=P_2$. For a given pump power there is a greater benefit to dividing the pump power in such a manner that the intracavity powers along feedback paths 112 and 113 are approximately equal, than the case where one wavelength has much greater intracavity power than the other.

Laser output 103 diverges as a consequence of the focused resonator mode between fold mirror 17 and output mirror 19. For some applications it may be desirable to have a collimated output. While one option for collimating the laser output is to use an external lens, a second option is illustrated in FIG. 1 in which concave mirror 19 is now a fold mirror whose radius of curvature and position with respect to laser resonator cavity waist 111w collimates the output in the direction of partial reflector flat output mirror 19'. Therefore, laser output 103' is collimated as it exits the laser resonator cavity, which in this case extends beyond mirror 19 to include output mirror 19'. The extended region of laser resonator cavity 15, collimated laser output 103' and output mirror 19' are shown in phantom in FIG. 1.

Figure 2:
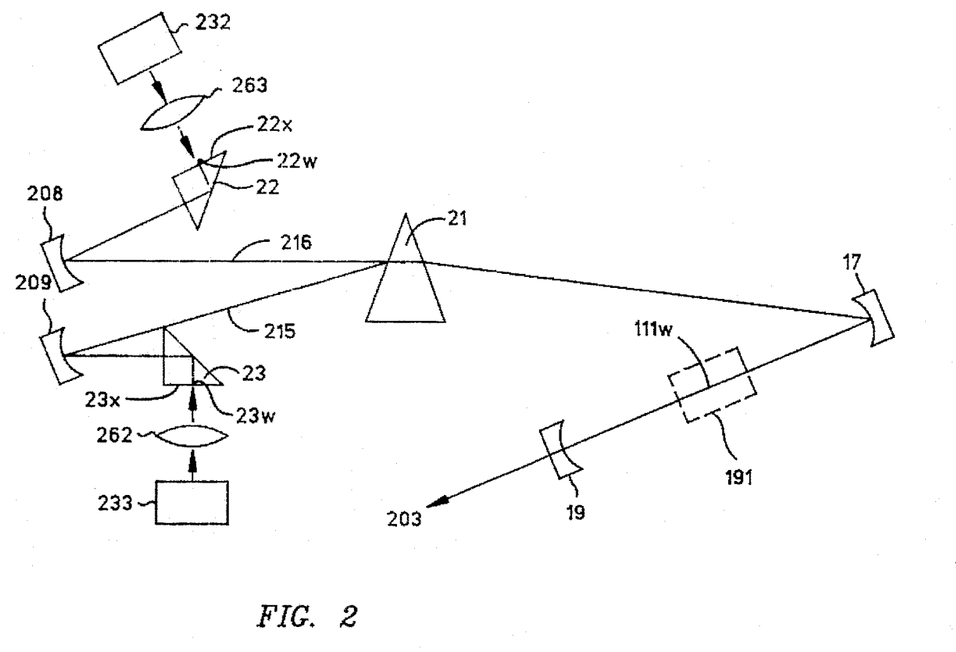
FIG. 2 shows a second laser configuration.

A second laser configuration is illustrated in FIG. 2. In this example of two laser gain elements 22 and 23 are end pumped by optical sources 232 and 233, respectively, and two wavelengths are produced simultaneously in laser output 203. For mode matching the pump radiation with the resonator radiation optical lenses 263 and 262 are used to focus the emission of optical sources 232 and 233, respectively. Laser gain elements 22 and 23 are shaped as right angle isosceles prisms so that the fold angle that laser resonator modes 215 and 216 make with fold mirrors 208 and 209, respectively, is substantially reduced relative to that shown in FIG. 1. Since off-axis use of spherical mirrors introduces astigmatism to the laser resonator mode, reducing the angle of incidence at fold mirrors 208 and 209 reduces the amount of astigmatism. The use of a laser gain element in the form of a right angle isosceles prism has been previously described in R. Scheps' and J. F. Myers' "Laser diode-pumped internally folded Nd:YAG laser," *IEEE Journal of Quantum Electronics*, 28, 1640 (1992).

Exterior faces 22x and 23x, of laser gain elements 22 and 23, respectively, are coated to be simultaneously highly transmissive for the pump radiation from optical sources 232 and 233, respectively, and highly reflective for the wavelengths along feedback paths 212 and 213, respectively. Fold mirrors 208 and 209 have radii of curvature and are spaced to create laser resonator cavity waists 22w and 23w at exterior faces 22x and 23x, respectively, of gain elements 22 and 23, respectively. This provides efficient end pumping of each gain element. In addition, fold mirrors 208 and 209 collimate the laser resonator modes between each respective fold mirror and fold mirror 17. Fold mirror 17 has a radius of curvature and is spaced to create a laser resonator cavity waist 111w between fold mirror 17 and output mirror 19. A non-linear sum frequency generating crystal 191 can be placed laser resonator cavity waist 111w as illustrated in FIG. 2.

In the illustration shown in FIG. 2, rotating laser prism 21 about the axis normal to the plane of FIG. 2 ("vertical axis") tunes both wavelengths simultaneously while maintaining a constant separation between the two wavelengths. Alternatively, rotating fold mirror 208 or 209 about its vertical axis tunes the wavelength along feedback path 212 or 213, respectively, while leaving the other wavelength constant. Additional gain elements can be inserted into the laser configuration shown in FIG. 2 to obtain additional wavelengths.

Figure 3:
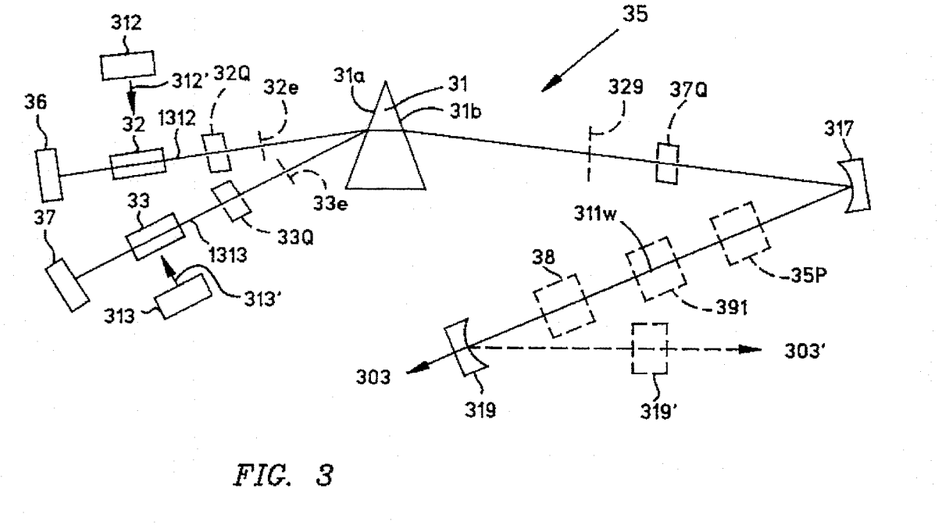
FIG. 3 shows a third laser configuration.

A third laser configuration is illustrated in FIG. 3. This design is particularly appropriate for side pumped laser gain elements. Side pumping refers to a means for optical excitation in which the optical pump power is directed towards the laser gain element along an axis transverse to the laser resonator axis. Two laser gain elements 32 and 33 are illustrated to produce two simultaneously oscillating wavelengths; however, it is to be understood that additional wavelengths operating simultaneously can be obtained by adding additional gain elements.

Laser gain elements 32 and 33 are optically excited by optical pump sources 312 and 313, respectively, located so that the optical pump power 312' and 313' from each pump source is incident upon laser gain element 32 or 33, respectively, transverse to laser resonator mode axes 1312 and 1313, respectively. Pump optical sources 312 or 313 can be laser sources, laser diodes, flash lamps, incandescent lamps or any other suitable optical pumping source for producing laser emission in laser gain elements 32 and 33. Feedback mirrors 36 and 37 may be flat or curved, concave or convex as appropriate. Fold mirror 317 is appropriately disposed to create a laser resonator cavity waist 311w between fold mirror 317 and output mirror 319. Laser prism 31 is disposed in the laser resonator cavity to provide wavelength dispersion and create separate feedback paths 1312 and 1313. In addition, a line narrowing element 32e or 33e can be disposed along feedback paths 1312 or 1313, respectively, to reduce the bandwidth of laser wavelengths fed back along path 1312 or 1313, respectively. Alternatively, line narrowing means 329 can be inserted in the laser resonator to simultaneously narrow the bandwidths of both wavelengths operating simultaneously in this exemplary case.

Means for interrupting the feedback at one or more wavelengths can be inserted into the cavity. Element 32Q can be a shutter or an electrooptic or acoustooptic Q-switch, for example, and is inserted in feedback path 1312 for the purpose of interrupting radiation along path 1312. Similarly, interrupting means 33Q is disposed along feedback path 1313 for interrupting feedback along path 1313. Alternatively, means 37Q can be disposed in the laser resonator cavity to simultaneously interrupt feedback along both paths 1312 and 1313 in this exemplary case.

A polarization rotating means 35P can be inserted in laser resonator cavity 35 to simultaneously rotate the polarization of all wavelengths operating in laser resonator cavity 35.

Laser prism 31 is a Brewster angle prism disposed in the cavity for minimum deviation. The Brewster faces of prism 31, 31a and 31b, establish a linearly polarized laser resonator mode within laser resonator cavity 35. A non-linear crystal 391, which for example may be a sum frequency generating crystal, can be disposed in the cavity at the position of laser resonator cavity waist 311w. In addition, an astigmatism-compensating means 38 can be disposed within laser resonator cavity 35 to compensate for astigmatism caused by the off-axis use of fold mirror 317. However, it is to be noted that the angle of incidence at fold mirror 317 can be relatively small, thereby introducing little astigmatism in the laser resonator mode.

Laser output 303 through output mirror 319 in general will be diverging as discussed above in relation to the laser configuration shown in FIG. 1. To produce a collimated output beam, output mirror 319 can be a concave fold mirror which collimates the laser resonator mode between fold mirror 319 and flat output mirror 319' to produce a collimated output 303' through output mirror 319'. In this case the laser resonator cavity is extended beyond fold mirror 319 to output mirror 319'. The extended part of laser resonator cavity 35, output coupler 319' and collimated laser output 303' are shown in phantom in FIG. 3.

Figure 4:
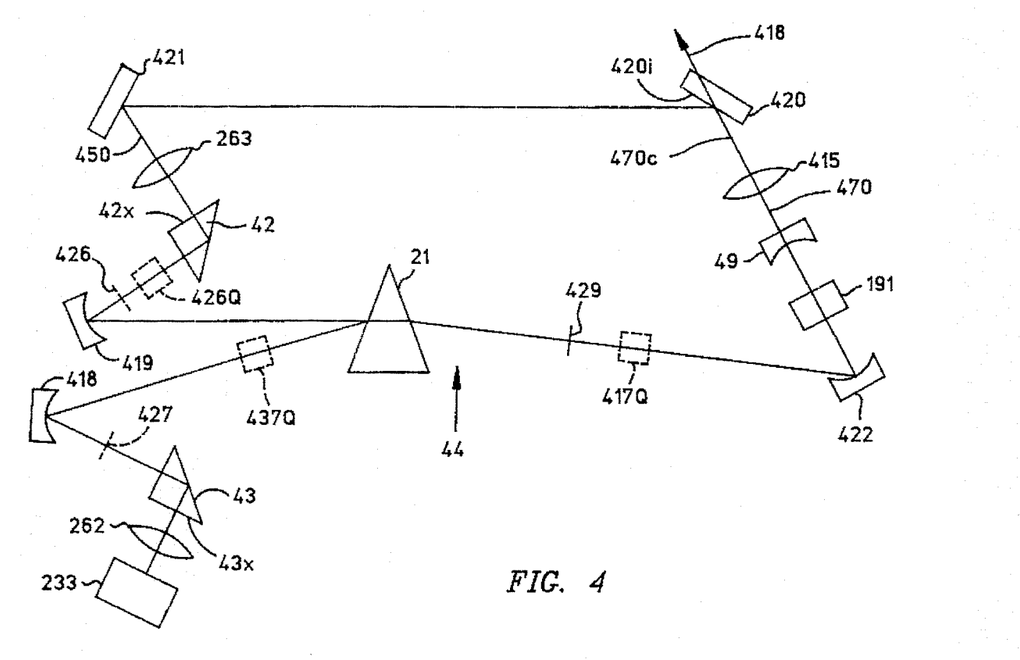
FIG. 4 represents a first embodiment of the invention.

A first embodiment of this inventive concept is illustrated in FIG. 4. This design is similar to the laser configuration illustrated in FIG. 2 except that only one pump optical source is required. This substantially simplifies the pump optics relative to those required for the laser configuration illustrated in FIG. 2. It is to be noted that although the embodiment illustrated in FIG. 4 is utilizable with the laser configuration illustrated in FIG. 2, this inventive concept is generic and can be applied to other laser configurations as well.

In this exemplary case, two fundamental wavelengths are produced simultaneously by laser 44. In addition, one of the two fundamental wavelengths produced by one of the gain elements is at a frequency suitable for optically pumping the other gain element. Referring to FIG. 4, prism-shaped gain element 43 emits a wavelength that is reflected from concave fold mirror 418, passes through prism 21 and is reflected by concave fold mirror 422 so that it can be used to optically excite prism-shaped gain element 42. As an example, prism-shaped gain element 43 may be Cr:LiSAF, prism shaped gain element 42 may be Nd:YAG, and the wavelength produced by prism-shaped gain element 43 may be 808 nm in this exemplary case. The emission produced by gain element 42 may be 1.06 μ. In this exemplary case laser 44 would produce simultaneous emission at 808 nm and 1.06 μ, and SFG crystal 191 would generate 459 nm emission. All three wavelengths would be contained in laser output 470. The emission from pump optical source 233 is focussed by lens 262 onto laser gain element 43. Pump optical source 233 may be a laser diode emitting at a wavelength between 610 nm and 690 nm. Optical pumping laser gain element 43 produces optical emission at a wavelength where laser gain element 42 absorbs. Using a beam splitter 420 the laser output from laser gain element 43 can be used to pump laser gain element 42, producing simultaneous output at both wavelengths under cw operation.

For efficient sum frequency generation, output mirror 49 may be coated to be highly reflective at the wavelength produced by prism-shaped gain element 42, but partially reflective at the wavelength produced by prism-shaped gain element 43. The output produced by laser gain element 43, transmitted through output mirror 49 and contained in output beam 470, is directed through lens 415 and by beamsplitter 420 and highly reflective flat 421 to lens 263. Lens 263 focuses the optical flux at or near exterior face 42x of prism-shaped gain element 42 to optically pump this gain element. Lens 415 is required to shape output 470 and produce collimated output beam 470c. Beamsplitter 420 is coated on interior face 420i to be highly reflective for the emission produced by prism-shaped gain element 43, and highly transmissive for other wavelengths which may be contained in laser output beam 470. These other wavelengths may include, for example, the sum frequency wavelength produced by SFG crystal 191, and the emission wavelength from prism-shaped gain element 42.

In the embodiment illustrated in FIG. 4, output mirror 49 can be coated to be partially reflective at 808 nm in this exemplary case. Appropriate reflectivities at 808 nm are 1% to 20% R. The 808 nm emission produced by laser 44 is collimated by lens 415. Lens 415 is not needed if the laser emission is collimated upon passage through output mirror 49. The 808 nm emission is reflected by flat beamsplitter 420, and reflected once more by flat mirror 421. The 808 nm emission is contained in pump beam 450 in this exemplary case and is used to optically pump the Nd:YAG laser gain element 42. When so excited, gain element 42 produces emission at 1.06 µ which is reflected by concave fold mirror 419, passes through prism 21 and is reflected by concave mirror 422. Exterior faces 42x and 43x of prism gain elements 42 and 43, respectively, are coated to be highly reflective at the resonant wavelength produced by the respective gain element. These coatings serve as a highly reflective end elements. The coating on exterior face 43x is also highly transmissive for the pump wavelength emitted by pump source 233, while the coating on exterior face 42x is highly transmissive for the pump wavelength contained in pump beam 450.

Therefore, only one pump laser, optical source 233, is required to excite both gain elements in this embodiment. With SFG crystal 191 disposed in laser 44, the laser generates 459 nm emission. This wavelength component of the laser output is transmitted by beamsplitter 420 and is contained in laser output 418.

Gain elements 42 and 43 are both end pumped. End pumping, sometimes called longitudinal pumping, is a technique that involves optical excitation of a laser gain element along an axis that coincides with the laser axis within that gain element. This can be contrasted with side pumping, where the optical excitation axis is transverse to the laser axis. A laser resonator that is optimized for end pumping will produce a laser resonator mode waist within the laser gain element. The pump flux is focused to a position in the proximity of the laser resonator mode waist. In addition, the size of the pump waist should match the size of the resonator mode waist. Matching these waists in both size and location within the gain element leads to the best pump and output efficiency, as well as establishing a gain aperture to select the lowest order spatial mode ($TEM_{00}$).

Means can be disposed in the laser resonator cavity for narrowing the linewidth at one or more wavelengths resonating simultaneously in laser 44. Such means can be an etalon, birefringent plate or plates, or any other suitable means for line narrowing. Referring to FIG. 4, line narrowing means 429 is inserted in a location suitable for narrowing the bandwidth at all wavelengths operating simultaneously in laser 44. Alternatively, means 426 can be inserted to narrow the linewidth at the wavelength produced by laser gain element 42, or means 427 can be inserted to narrow the linewidth at the wavelength produced by laser gain element 43. Any combination of line narrowing means 429, 426 and 427 can be used simultaneously in laser 44.

Means 417Q can be disposed in the laser resonator cavity for suppressing oscillation. Such means can be a Q-switch, or mechanical shutter, or any other suitable device. As illustrated in FIG. 4, means 417Q is disposed to interrupt oscillation at all wavelengths simultaneously. Alternatively, means 426Q can be disposed to suppress oscillation at the wavelength produced by laser gain element 42, or means 437Q can be disposed to suppress oscillation at the wavelength produced by laser gain element 43. Any combination of suppressing means 426Q, 437Q and 417Q can be used simultaneously in laser 44.

The concentration of activator ions in the host materials for laser gain elements 42 and 43 are in the range of 0.1% to 100% by weight. The host material for one or both laser gain elements 42 and 43 can be alexandrite, LiCAF, LiSAF, LiSGAF, or mixtures thereof.

Figure 5:
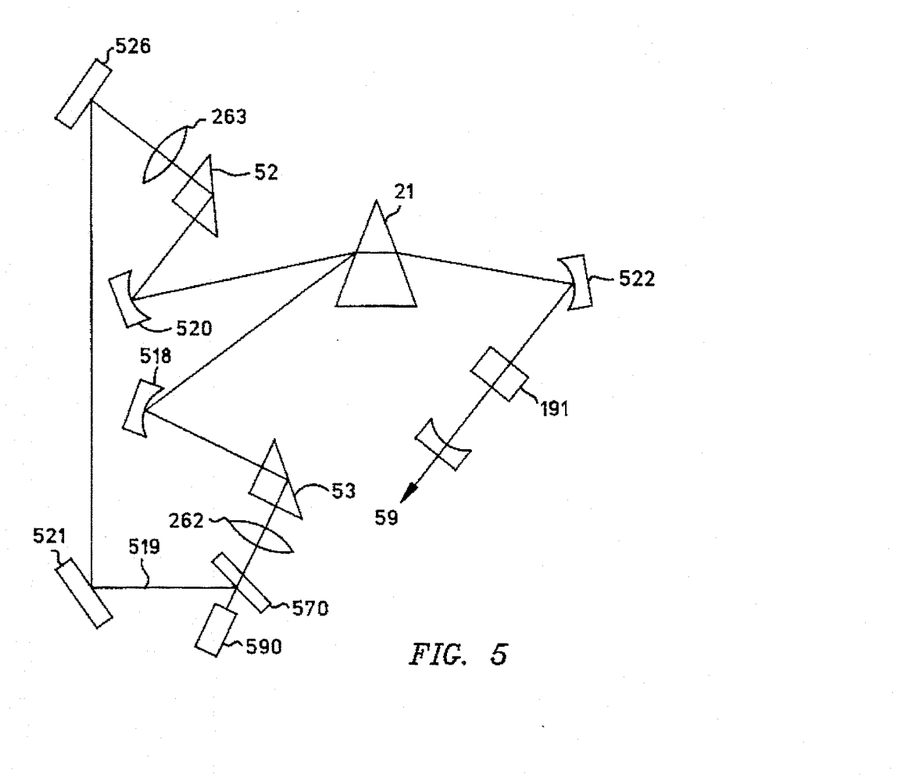
FIG. 5 represents a second embodiment of the invention.

A second embodiment of this inventive concept is illustrated in FIG. 5. This design is similar to the embodiment shown in FIG. 4 in that only one pump source is required. It is to be noted that although the embodiment illustrated in FIG. 5 is based on the laser configuration illustrated in FIG. 2, the concept is generic and can be applied to other laser configurations disclosed herein. In FIG. 5, both gain elements can be pumped at the same wavelength and therefore require only one pump laser. As an example, prism-shaped laser gain element 53 can be a $Cr^{3+}$ doped solid state material such as Cr:LiSAF. Prism shaped gain element 52 may also be a $Cr^{3+}$ doped gain element such as the co-doped crystal Cr,Nd:GSGG. Cr,Nd:GSGG is $Gd_3Sc_2Ga_3O_{12}$ (GSGG) doped with $Cr^{3+}$ and $Nd^{3+}$ ions and is a type of laser gain element referred to as "co-doped". This laser gain element has been shown to be a highly efficient emitter of 1.06 µ radiation when pumped at approximately 650 nm. See R. Scheps, *Applied Physics Letters*, vol. 59 p. 1287, 1991.

Pump laser 590 emits collimated pumping emission at a wavelength which can optically excite both laser gain elements 53 and 52. In this exemplary case the pumping emission is a wavelength in the range of 610 nm to 690 nm. Beamsplitter 570 is used to transmit part of the pump power, for example 50%, to lens 263 for pumping laser gain element 53. Laser gain element 53 provides an emission that is reflected by concave fold mirror 518, passes through prism 21 and is reflected by concave mirror 522. Part of the pump power is reflected by beamsplitter 570, for example 50%, to form collimated pump beam 519. Pump beam 519 is steered by highly reflective mirrors 521 and 526 to focusing lens 263 to pump laser gain element 52. Laser gain element 52 provides an emission that is reflected by concave fold mirror 520, passes through prism 21 and is reflected by concave mirror 522. In the exemplary case where laser gain element 53 is Cr:LiSAF and laser gain element 52 is Cr,Nd:GSGG, dual wavelength operation can be achieved simultaneously at 808 nm and 1.06 µm. By use of SFG crystal 191, output 59 will contain blue emission at 459 nm.

A laser in accordance with this inventive concept has a wide range of applications including various medical, sensing, pollution monitoring, laser ranging, aircraft wind speed and wind shear measurement applications, surveillance and communications.

It should therefore be readily understood that many modifications and variations of the present invention are possible within the purview of the claimed invention. It is therefore to be understood that within the scope of the appended claims, the invention may be practiced otherwise than as specifically described.

We claim:

1. A laser producing optical emission at two wavelengths simultaneously comprising:

a laser resonator for said optical emission defining a laser resonator cavity, said laser resonator including two highly reflective end elements, three highly reflective concave fold mirror elements, and an output coupler reflective element arranged to form a reflective path defining said laser resonator cavity therebetween;

a dispersing prism disposed in said laser resonator cavity to spatially disperse said optical emission at two wavelengths, said dispersing prism and one of said two highly reflective end elements being arranged to define a first path that is resonant for light at one of said two wavelengths, and said dispersing prism and the other of said two highly reflective end elements being arranged to define a second path that is resonant for light at the other of said two wavelengths;

a first laser gain element disposed in said first path and a second laser gain element disposed in said second path, each laser gain element being aligned to emit light at a different one of said two wavelengths; and means comprising a single pump laser for optically exciting said first and second laser gain elements by end pumping.

2. The laser of claim 1 in which said light at one of said two wavelengths end pumps one of said first and second laser gain elements.

3. The laser of claim 2 further including:

means for directing the optical emission at said one wavelength to said one laser gain element, said output coupler reflective element being coated to be partially transmissive for said one wavelength.

4. The laser of claim 3 in which one of said two wavelengths is between 800 nm and 820 nm, the other of said two wavelengths is approximately 1.06 μ, and one of said first and second laser gain elements is $Nd^{3+}$-doped.

5. The laser of claim 1 in which one of said two highly reflective end elements is a highly reflective coating deposited on an exterior face of one of said two laser gain element.

6. The laser of claim 5 in which said highly reflective coating transmits light at one of said two wavelengths.

7. The laser of claim 1 in which said first and second laser gain elements are end pumped by light at the same wavelength.

8. The laser of claim 7 in which said first and second laser gain elements are doped with $Cr^{3+}$ ions.

9. The laser of claim 8 in which one of said first and second laser gain elements is co-doped with $Nd^{3+}$ and $Cr^{3+}$ ions and has the property to emit radiation at approximately 1.06 μ, and the other of said first and second laser gain elements has the property of emitting radiation at one wavelength between 800 nm to 820 nm.

10. The laser of claim 1 further including:

means disposed in said laser resonator cavity for narrowing the linewidth at one wavelength operating simultaneously in said laser.

11. The laser of claim 1 further including:

means disposed in said laser resonator cavity for suppressing oscillation of one radiation at one wavelength within said laser resonator cavity.

12. The laser of claim 1 in which one laser gain element includes a host material doped with activator ions to produce a laser emission at one of said two wavelengths when it is optically excited by end pumping.

13. The laser of claim 12 in which the concentration of said activator ions in said host material is adjusted to produce high efficiency for said laser emission at said one of said two wavelengths.

14. The laser of claim 12 in which said first and second laser gain elements are composed of similar activator ions in a similar host.

15. The laser of claim 14 in which the concentration of said activator ions in each said host is different.

16. The laser of claim 12 in which said activator ions in said host include ions in an effective percentage concentration between approximately 0.1% and 100% by weight, and said host is selected from a group consisting of alexandrite, LiCAF, LiSAF, LiSGAF and mixtures thereof.

17. The laser of claim 1 in which said means for optically exciting said first laser gain element and said second laser gain element is a pump laser emitting a cw pump beam.

18. The laser of claim 17 in which said means for optically exciting is a laser diode.

19. The laser of claim 1 in which said means for optically exciting said first laser gain element and said second laser gain element is a pump laser emitting a pulsed pump beam.

20. The laser of claim 19 in which said means for optically exciting is a laser diode.

21. The laser of claim 1 further including:

means disposed within said laser resonator cavity for producing sum frequency generation, the sum frequency generating means being disposed at a laser resonator cavity waist.

22. The laser of claim 21 in which said sum frequency generating means is a KTP crystal.

23. The laser of claim 1 in which one of said two wavelengths is approximately 1.06 μ and the other of said two wavelengths is approximately 808 nm.

24. The laser of claim 23 further including:

a non-critically phased match KTP crystal disposed in the proximity of a laser resonator cavity waist to provide sum frequency generation of said two wavelengths and produce laser emission at about 459 nm.

* * * * *